Patented Jan. 19, 1954

2,666,760

UNITED STATES PATENT OFFICE 2,666,760

INSOLUBLE METHYL-BENZODIAZEPIN SALTS OF PENICILLIN

Gerard W. Curtis, Edgewater, and Sylvio A. De Lorenzo, Lawrence Township, Mercer County, N. J., assignors, by mesne assignments, to American Cyanamid Company, New York, N. Y., a corporation of Maine No Drawing. Application July 6, 1951, Serial No. 235,562

3 Claims. (Cl. 260—239.1)

This invention relates to new salts of penicillin and to methods for the preparation thereof and more specifically, to new benzodiazepin salts of penicillin which can be represented by the following formula:

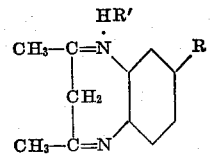

wherein R represents either H or a methyl group, and R' represents a penicillin radical.

It has now been discovered that relatively insoluble salts of penicillin may be prepared by bringing together in solution penicillin and an acid addition salt of a compound selected from the group consisting of 2,4-dimethyl (1,5) benzodiazepin and 2,4,7-trimethyl (1,5) benzodiazepin to form respective penicillin salts thereof.

The reactions may be typically illustrated as follows:

(a)

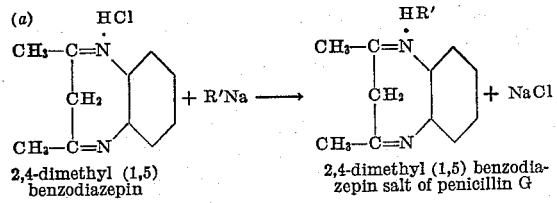

2,4-dimethyl (1,5) benzodiazepin 2,4-dimethyl (1,5) benzodiazepin salt of penicillin G where R' represents the penicillin G radical.

(b)

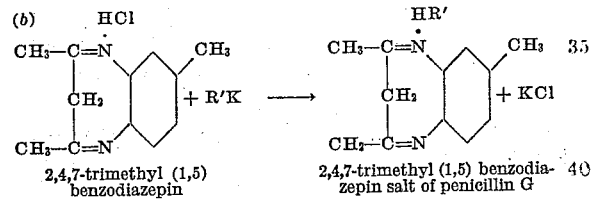

2,4,7-trimethyl (1,5) benzodiazepin 2,4,7-trimethyl (1,5) benzodiazepin salt of penicillin G where R' represents the penicillin G radical.

In a more specific embodiment of this invention, benzodiazepin salts of penicillin can be prepared by mixing a soluble acid addition salt of the basic material such as for example the hydrochloride, sulfate, phosphate, formate, etc. of either 2,4-dimethyl or 2,4,7-trimethyl benzodiazepin with a soluble penicillin salt, such as sodium, potassium, ammonium or triethylamine, in an aqueous solution at a pH ranging between 4.5–8.0, a pH of about 6.5 being preferred. Upon mixing, the benzodiazepin penicillin salts which are very insoluble in water are precipitated out of solution. To increase the recovery of the desired product, the mixture containing the benzodiazepin salt and water is desirably cooled for a period of time prior to the addition of the soluble penicillin salt. The benzodiazepin salts of penicillin are recovered by filtration and are then preferably washed first with water and then with a low boiling water-miscible solvent such as acetone, and subsequently dried under vacuum.

Similarly the benzodiazepin salt of benzodiazepin may be recovered in crystalline form by adding an acid salt of benzodiazepin to a solution of penicillin salt in an organic solvent in which both reactants are sufficiently soluble, for example benzodiazepin hydrochloride and sodium penicillin may be reacted in butyl alcohol. Also, the acid form of penicillin and the free base of benzodiazepin may be reacted in a suitable organic solvent although preferably the salts of both reactants would be utilized if they were soluble in the organic solvent employed.

The penicillin embodied in the benzodiazepin salt may be a mixture of one or more of the specific penicillins such as are commonly obtained in the production of penicillin G, K, or any of the other known penicillins, or may be a penicillin which consists mainly or wholly of one specific penicillin. Preferably a penicillin rich in penicillin G is used. The penicillin used may be either in amorphous or crystalline form. Although it is highly desirable in the preparation of benzodiazepin penicillin salts, to start with an aqueous solution containing penicillin, excellent results are likewise obtained by using a dry penicillin of considerable purity.

The aqueous solution containing penicillin may be one prepared by dissolving a relatively pure penicillin salt in an aqueous medium or it may be an aqueous solution obtained by any other convenient means such as by extraction from some other composition of penicillin. An acid addition salt of benzodiazepin is dissolved in an aqueous medium such as an aqueous buffer or water. The acidity of the two aqueous solutions is desirably such that when they are mixed, the pH of the resultant mixture will be about 6.0. The two aqueous solutions are then mixed with stirring. Since the benzodiazepin salts of penicillin are relatively insoluble in water, they precipitate from the reaction mixture quite promptly in the form of solid material and are then conveniently recovered by filtration.

When the initial penicillin salt used is of relatively high purity, the precipitate is usually a crystalline material either immediately on forming or within a short time thereafter. The salt produced may be recrystallized by conventional means if desired.

The following examples illustrate the methods of carrying out the present invention, but it is to be understood that these examples are given by way of illustration and not of limitation:

*Example I*

Ten grams of 2,4,7-trimethyl (1,5) benzodiazepin hydrochloride was dissolved in 150 cc. of distilled water. The pH of the solution was then adjusted to pH 6.5 with disodium phosphate and filtered. The resultant solution was stirred at 25° C. and then 10 grams of crystalline sodium penicillin G was added thereto. The penicillin went into solution and immediately after crystallization a heavy magma of purple-colored crystals was obtained. The crystals were filtered off, washed with distilled water, and then dried under vacuum. Eleven and five-tenths grams of crystalline material was obtained. The crystalline material had a potency of about 1000 µ/mg. (biological assay). A yield of about 74.0% based on the original potency of the sodium penicillin used was obtained.

*Example II*

Four and nine-tenths grams of 2,4-dimethyl (1,5) benzodiazepin hydrochloride was dissolved in 1000 cc. of distilled water. The solution was stirred at 25° C. and to it was added, over a period of one-half hour, a solution containing 5.5 grams of crystalline sodium penicillin G in 200 cc. of water. During the addition, purple-colored crystals precipitated out of solution. After all of the penicillin solution had been added, the magma was stirred for an additional fifteen minutes. After standing one-half hour the solution was filtered off, washed with water, and then washed with six 20 cc. portions of anhydrous acetone. The product was subsequently dried in a vacuum desiccator. Ten and five-hundredths (10.05) grams of crystalline material possessing a melting point of 103.6°–104.6° C. and a potency of about 1055 µ/mg. (biological assay) was obtained. The yield was about 84.0% based on the original potency of the sodium penicillin G used.

The finished benzodiazepin salts of penicillin may be employed therapeutically for the antibiotic effect of the penicillin and the salts may be administered orally, for example, by admixture with water or other non-toxic liquids. They may also be prepared and distributed for oral use in dry form with or without added buffer or other agents and with or without excipients as a powder or in capsules or in compressed form as tablets.

For parenteral administration, therapeutic compositions may be prepared embodying benzodiazepin salts with penicillin or a mixture thereof in combination with an injectable menstruum. Benzodiazepin salts of penicillin can be dispensed as a suspension in an injectable menstruum in a particle size suitable to pass through a convenient hypodermic needle. Since suspensions of the salt in water and fatty oil mediums are characterized by an unusually long therapeutic effect, intramuscular administration of such compositions produce a constant concentration of penicillin in the blood at a therapeutically effective level, i. e. the penicillin is very slowly released from this insoluble salt thereby making it possible to maintain therapeutic blood levels over a much longer period than is attainable with a water soluble penicillin salt in aqueous solution or in suspensions in oil or in oil or beeswax.

The benzodiazepin salts of penicillin made in accordance with the present invention are stable and no loss in potency was observed at room temperature for a period in excess of 1 year. Furthermore, pharmacological tests have shown that the benzodiazepin salts of penicillin while slightly irritating compare favorably with known salts of penicillin insofar as therapeutic effectiveness is concerned.

While the invention has been described in some detail, it is understood that various changes and modifications may be made without departing from the spirit and scope thereof. Insofar as these changes and modifications are within the scope of the appended claims they are to be considered as part of this invention.

We claim:

1. A penicillin salt of a compound represented by the following formula:

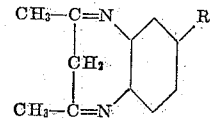

wherein R represents a member of the group consisting of methyl and hydrogen.

2. 2,4-dimethyl (1,5) benzodiazepin salt of penicillin.

3. 2,4,7-trimethyl (1,5) benzodiazepin salt of penicillin.

GERARD W. CURTIS.
SYLVIO A. DE LORENZO.

References Cited in the file of this patent

UNITED STATES PATENTS

| Number | Name | Date |
|---|---|---|
| 2,515,898 | Rhodehamel | July 18, 1950 |
| 2,558,014 | Stiller | June 26, 1951 |

OTHER REFERENCES

Monash: "Science," vol. 107, October 17, 1947, p. 370.